United States Patent [19]

Neale

[11] Patent Number: 4,552,490

[45] Date of Patent: Nov. 12, 1985

[54] SOLIDS FEED CONTROL VALVE ASSEMBLY

[75] Inventor: Thomas J. Neale, Parsippany, N.J.

[73] Assignee: Foster Wheeler Energy Corporation, Livingston, N.J.

[21] Appl. No.: 689,497

[22] Filed: Jan. 7, 1985

Related U.S. Application Data

[63] Continuation of Ser. No. 482,808, Apr. 7, 1983, abandoned.

[51] Int. Cl.[4] .............................. B65G 53/48
[52] U.S. Cl. ...................... 406/56; 48/86 A; 137/240; 239/112; 239/456; 406/163; 406/174
[58] Field of Search ............ 406/53, 55, 56, 60, 406/61, 157, 163, 174; 48/86 A; 137/240, 238, 890; 414/160, 196, 197; 239/112, 113, 433, 456; 110/261, 263, 265

[56] References Cited

U.S. PATENT DOCUMENTS

| | | | |
|---|---|---|---|
| 717,634 | 1/1903 | Smead | 48/86 A X |
| 2,321,015 | 6/1943 | Davis | 406/56 X |
| 3,133,554 | 5/1964 | Joebken | 137/240 |
| 3,693,842 | 9/1972 | Cozzarin et al. | 406/55 |
| 4,194,523 | 3/1980 | Lubieniecki | 137/238 |
| 4,318,355 | 3/1982 | Nelson | 110/263 X |

FOREIGN PATENT DOCUMENTS 551229  5/1977  U.S.S.R. ........................ 406/163

*Primary Examiner*—Jeffrey V. Nase
*Attorney, Agent, or Firm*—Marvin A. Naigur; John E. Wilson; Martin Smolowitz

[57] ABSTRACT

A control valve assembly for controlling particulate solids feed upward into a fluidized bed reactor, utilizing a purged valve seat mating with a poppet head and valve stem having a vented clearance space. The valve seat surface and a stem clearance space are each purged by a clean externally supplied gas, the solids flair in an elbow-shaped passageway are fluidized by air supplied through booster nozzles, and the valve stem is operated by a pneumatic actuator. A particulate solids material such as coal is transferred by a screw conveyor through a horizontal conduit, and then fed through the elbow-shaped passageway and the poppet valve seat upwardly into the reactor fluidized bed.

12 Claims, 3 Drawing Figures

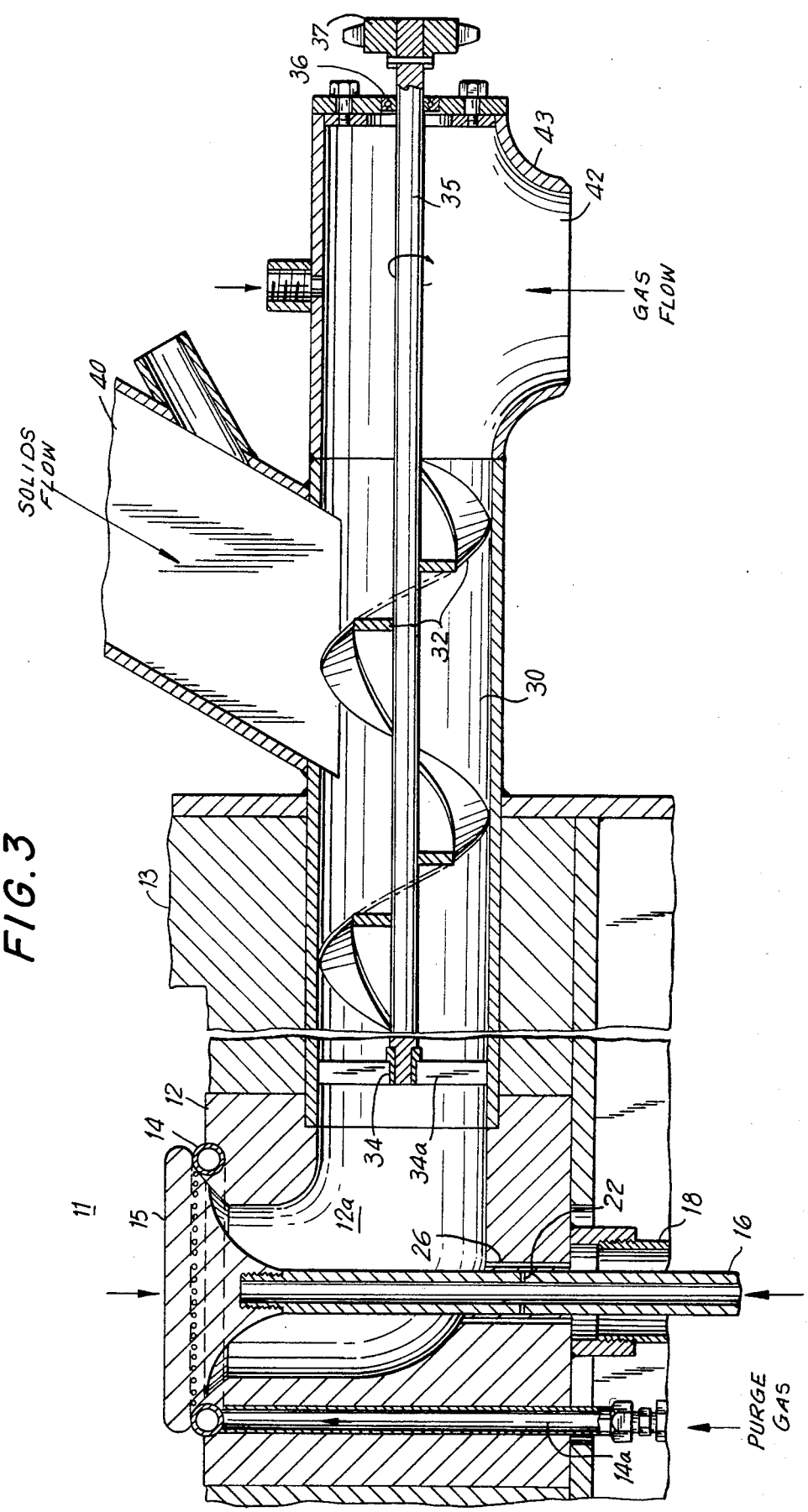

SOLIDS FEED CONTROL VALVE ASSEMBLY

This application is a continuation of application Ser. No. 482,808 Filed Apr. 7, 1983 now abandoned.

BACKGROUND OF INVENTION

This invention pertains to a valve assembly for controlling particulate solids feed, and particularly relates to such a control valve assembly utilizing a purged poppet valve head and seat and guide bushing configuration for feeding particulate solids upwardly into a vessel, such as coal to a gasifier.

The feeding of particulate solids into a vessel such as coal into a gasifier is generally known. For example, U.S. Pat No. 2,088,679 to Yamazaki et al. shows feeding of solid fuel such as coal to a gasifier by a horizontal screw conveyor. U.S. Pat. No. 2,667,409 to Hubmann shows a gas producer having a poppet type valve located at its lower outlet end for ash removal. Also the need to purge valve seat mating surfaces for valves handling particulate solids is generally known. For example, U.S. Pat. No. 3,703,908 to Tellier shows a poppet valve and seat arrangement in which entrapped gas is squirted through the mating seat to purge it. U.S. Pat. No. 4,188,174 to Perkins shows a valve handling abrasive slurries in which the valve seat is purged by a washing fluid supplied through an annular outlet. Also, U.S. Pat. No. 3,470,899 to Cusi shows a valve having a purged guide bushing.

Although considerable efforts have been made in the past to develop control valve systems suitable for reliably feeding of particulate solids to vessels, none of the known prior art valve arrangements have been found to be entirely satisfactory for handling the upflow of particulate solids into vessels such as coal into a gasifier.

SUMMARY OF INVENTION

The present invention provides a valve assembly for particulate solids feed control for use with a fluidized bed reactor. The valve assembly comprises a body having an elbow-shaped flow passageway and a purged valve seat incorporated therein, with a mating poppet type head configuration attached to the upper end of an elongated actuator stem. The actuator stem is disposed in the cast elbow-shaped body and in a vertical tube attached to the base of said cast elbow body and extending through a plenum chamber of a reactor to a packing gland located external to the reactor. The actuator stem is attached to the valve head such as by a threaded connection, and has a clevis fixed to the stem opposite end cooperating with an actuator means. The valve head is a poppet-type configuration attached to the actuator stem and cooperates with the purged valve seat located at the top of the elbow body, thereby providing a gas purged valve seat.

The actuator stem is made close-fitting in the valve body lower portion so as to provide a small clearance space there-between. The actuator stem is also equipped with a series of purge holes in the stem, thereby providing an inert purge for cleaning and cooling the annular space between the actuator stem and the body.

Flow of particulate solids through the valve is facilitated by booster nozzles located in the lower portion of the valve body. The vertical tube is equipped with a tee connection above the packing gland for booster air inlet, whereby a booster air supply cooperates with the multiple booster nozzle(s) which are a series of holes in the base of the elbow passageway in the valve body.

The valve seat and actuator stem are located in a cast elbow-shaped body embedded in the refractory floor of the reactor, and the body inlet is connected to a conduit extending horiontally to a location external of the reactor. A rotatable ribbon mixer and screw conveyor is disposed in the horizontal conduit, and is rotatably supported internally on each end, and at the outer end is equipped with drive means such as a sprocket cooperating with a rotatable mechanical drive. A discharge chute from a rotary airlock is connected to the outer end of the horizontal conduit above the ribbon mixer external to the reactor. Also, an inlet tee for a transport gas is fixed to said horizontal conduit at the lower end of the ribbon mixer opposite the discharge chute externally of said reactor.

The discharge chute in cooperation with transport air conveys the particulate solids material through the horizontal conduit into the valve body passageway. The ribbon mixer and conveyor provides for continual mixing of solids to prevent agglomeration within the horizontal conduit and movement into the valve body passageway. Discharge of the particulate solids material upwardly through the valve seat into the reactor is assisted by the booster nozzles located around the valve stem, and for which air flow rate is controlled external to the reactor. The pneumatic actuator is provided externally of the reactor for selectively moving the actuator stem and attached valve head relative to the valve seat, so as to control the flow of particulate solids material upwardly into the reactor.

BRIEF DESCRIPTION OF DRAWINGS

FIG. 3 shows the upper portion of the poppet valve assembly and elbow passageway downstream from a screw conveyor configuration and arranged for feeding particulate solids upwardly into a vessel.

DESCRIPTION OF INVENTION

Figure 1:
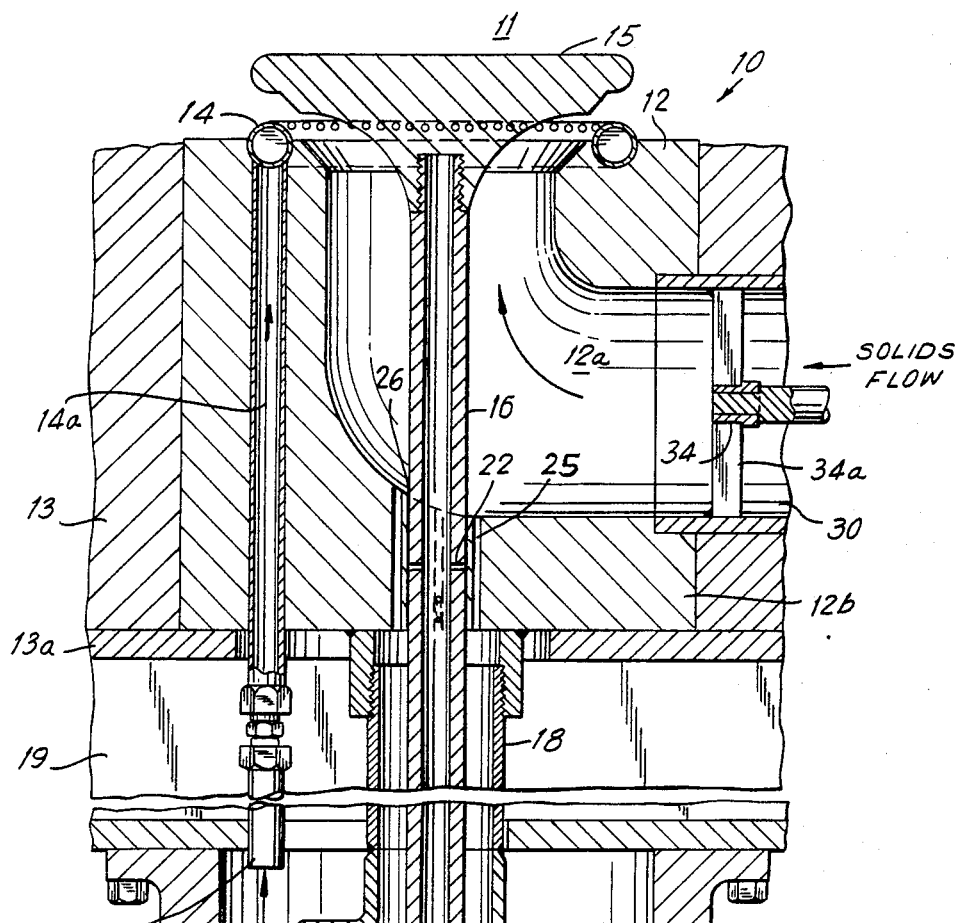
FIG. 1 is a cross-sectional view of the solids flow control valve assembly of the present invention.

The invention will now be described more fully by reference to the drawings. As shown in FIG. 1, a solids feed control valve assembly 10 is provided for controlling the flow of particulate solids feed upwardly into a fluidized bed reactor 11. The valve has a cast body 12 having an elbow-shaped passageway 12a which is embedded in the refractory floor 13 of the reactor. The valve body 12 has a torus-shaped purged valve seat 14 incorporated into the elbow-shaped body 12 with a purge gas being supplied through gas flow passageway 14a at connection 14b. The torus-shaped manifold is located radially outwardly from the valve seat 14. A mating valve head 15 seats onto valve seat 14 and is rigidly attached to the upper end of an elongated actuator stem 16. From the manifold, the purge gas passes through at least four equally-spaced ports directed radially inwardly toward the valve head 15. The actuator stem 16 is disposed in the cast elbow body 12 and a vertical elongated tube 18 is attached to the base of the cast elbow body 12 and extends through a plenum chamber 19 of the reactor to a packing gland 20 located external of the reactor. The valve body 12 and head 15 are usually made of a casting suitable for high temperature service, such as Hastelloy C-276. The actuator stem 16 is made of a heavy gage metal tubing threaded at the upper end and attached to the valve head 15. A clevis 17 is fixed to the stem opposite end and cooperates with a pneumatic actuator means (not shown).

The valve head 15 is a cylindrical poppet-type configuration attached to the actuator stem 16 cooperating with the purged valve seat and header 14 at the top of the cast elbow body 12, thereby creating a purged valve seat arrangement.

Figure 2:
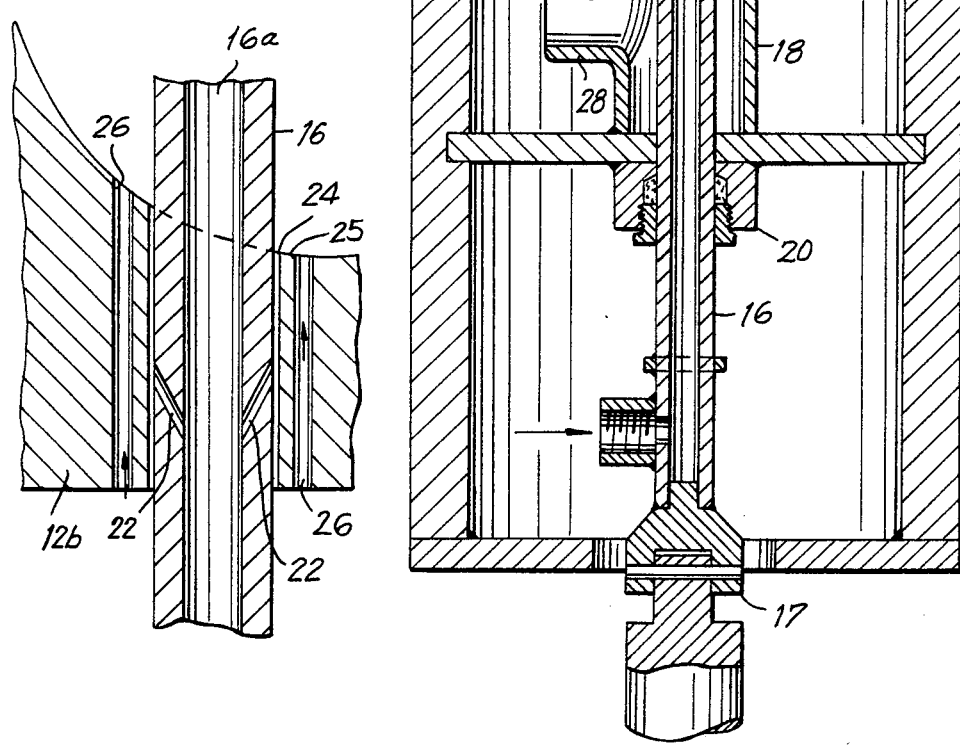
FIG. 2 is an enlarged partial cross-sectional view of the lower valve body portion showing the valve stem and purge holes therein.

The actuator stem 16 is made close-fitting in the valve body lower portion 12b so as to provide a small radial clearance space 24 between the stem and the body portion. If desired, a replaceable bushing 25 may be provided in the body portion 12b close fitting around stem 16. As shown in detail in greater FIG. 2, the actuator stem is also equipped with at least two purge holes 22 in the wall of stem 16, thereby providing for flow of an inert gas purge through stem passageway 16a and holes 22 for cleaning the annular clearance space 24 and also for cooling the valve stem 16. The radial clearance between the stem and body portion or bushing is usually 0.010–0.030 inch.

For facilitating the reliable flow of particulate solids through the valve body elbow-shaped passageway 12a, at least one booster nozzle 26 is provided in the body 12 radially outwardly from clearance space 24. Below valve body 12a vertical tube 18 is equipped with a tee connection 28 located above the packing gland 20 provided for sealing around the stem 16. A booster air suply is provided at tee 28, whereby the booster air passes through booster nozzle(s) 26 which are provided in the base portion 12b of the cast elbow body 12.

As shown in FIG. 3, the valve body elbow 12 inlet is attached to a conduit 30 extending horizontally to a location external to the reactor 11. A rotatable ribbon mixer and screw conveyor 32 is disposed in the horizontal conduit 30, and supported internally at one end by bearing 34 and radial support members 34a, and at the other or outer outer end by bearing 36. The mixer shaft 35 is rotated by suitable means such as a sprocket 37 cooperating with a mechanical drive means (not shown). A discharge chute 40 from a rotary airlock (not shown) is connected to the horizontal conduit 30 inlet end above the ribbon mixer conveyor and external of the reactor 11. Also, an inlet tee 43 for a transport gas such as air is attached to the horizontal conduit 30 at the rear of the ribbon mixer and opposite from the discharge chute 40 external of the reactor.

In operation for feeding particulate solids such as coal and/or lime into the reactor, the discharge chute 40 in cooperation with transport air supplied at connection 42 conveys the particulate solids material through the horizontal conduit 30 into the flow passageway 12a in cast body-elbow 12. The ribbon mixer and screw conveyor 32 provides for continual mixing to prevent solids agglomeration within the horizontal conduit. The discharge of solids material into the reactor 11 is asssisted by the booster nozzles 26, for which air flow is controlled externally of the reactor. A pneumatic actuator (not shown) is provided externally of the reactor for selectively moving the valve stem 16 and valve head 15 relative to the valve seat 14, to control the upward flow of particulate solids material into the reactor.

Although the invention has been described broadly and in terms of preferred embodiments, it will be understood that various modifications and variations can be made and that some features can be employed without others, all within the spirit and scope of the invention which is defined solely by the following claims.

I claim:

1. A poppet type valve assembly with gas purged seat for controlling flow of particulate solids therethrough, comprising:
   (a) a valve body having a solids flow passageway therein and having a purged valve seat located at the passageway outlet end;
   (b) a torus-shaped manifold located radially outwardly from the valve seat, said manifold having multiple outlet ports for directing a purge gas flow radially inwardly toward a mating valve head, said manifold being connected to a gas flow passageway located within said valve body for supplying a purge gas to said valve head;
   (c) a poppet type valve head mating with said valve seat, said head being rigidly attached to an elongated stem, said stem passing through a packing gland arranged for pressure sealing around the elongated stem, said stem being adapted for moving said valve head relative to said valve seat;
   (d) an elongated tube extending between said valve body and said packing gland and surrounding said valve stem; and
   (e) at least one booster nozzle located in said valve body adjacent said valve stem for passing a gas therethrough to facilitate passage of the particulate solids through the valve body passageway; and whereby the poppet valve head seating surface is gas purged to remove particulate solids therefrom.

2. The poppet valve assembly of claim 1, wherein said torus-shaped manifold is at least partially embedded within said valve body, said manifold having at least four equally spaced ports therein oriented radially inwardly toward said valve head.

3. The poppet valve assembly of claim 1, wherein said solids flow passageway is elbow-shaped for solids flow upstream of said valve seat, said gas flow passageway being a tubular connection for supplying purge gas to said torus-shaped manifold provided for purging the valve head.

4. The poppet valve assembly of claim 1, wherein the valve head is opened and closed by mechanical actuator means connected to the lower end of said valve stem.

5. The poppet type valve assembly of claim 1, wherein said valve elongated stem passes through a lower portion of said valve body to provide a narrow annular clearance therebetween, said stem having an elongated passageway therein and at least two transverse openings therein arranged for passing a purge gas through said stem passageway and outwardly through said openings and through the narrow annular clearance space between the stem and a valve body bushing, so as to purge particulate solids from the annular clearance space.

6. The poppet valve of claim 5, wherein the annular space radial clearance is 0.010–0.030 inch and the purge gas is introduced into said stem pssageway at a location below said packing gland.

7. A solids feed and control valve assembly for feeding particulate solids upwardly into a fluidized bed reactor, comprising:
   (a) a valve body having a seat incorporated therein, said seat being adapted for mating with a poppet type valve head, said valve body having an elbow-shaped solids flow passageway located upstream of said valve seat;

(b) a poppet type valve head located above and mating with said valve seat and rigidly attached to an elongated stem, said valve head being purged by an external gas source, said stem arranged for passing through a packing gland in said valve body for sealing around said elongated stem, said stem being adapted for moving the valve head relative to the valve seat;

(c) at least one booster nozzle located in said valve body near said elongated stem for passing a gas therethrough to facilitate passage of particulate solids through said flow passageway; and (d) a horizontal rotatable ribbon mixer and screw conveyor means for feeding the particulate solids to said elbow-shaped passageway and through said valve seat, wherein a source of transport gas is provided at the inlet end of said mixer and screw conveyor means to assist in moving the solids through the mixer and screw conveyor means and to the passageway in the valve body, to permit the particulate solids to be conveyed through said elbow-shaped passageway and valve seat upwardly into the reactor.

8. The solids feed and control valve assembly of claim 7, wherein a chute is provided at the inlet of said screw conveyor for feeding particulate solids to the conveyor.

9. A method for feeding particulate solids through a control valve upwardly into a reactor, comprising:

(a) conveying particulate solids from a feeder chute through a horizontal conduit and upwardly into a flow passageway of a poppet type control valve, said control valve including a valve body having a seating surface and a mating valve head with stem attached thereto for controlling operation of the valve head in the valve body;

(b) opening said valve head a controlled amount by actuator means mechanically attached to the lower end of said valve stem;

(c) purging the valve head by passing a gas through multiple spaced openings in a manifold attached to the valve body and encircling said valve head, so as to purge the valve head and prevent deposits of the particulate solids between the valve seating surface and valve head; and (d) passing a fluidizing gas upwardly through at least one opening located in the valve body near the valve stem and into the flow passageway to fluidize the particulate solids therein and facilitate flow of the particulate solids through the valve and into the reactor.

10. The method for feeding particulate solids of claim 9 wherein a purge gas is passed through a longitudinal passageway in said valve stem and outwardly through at least one opening in said stem and through a radial clearance space between said stem and the valve body.

11. A method for feeding particulate solids through a control valve upwardly into a reactor, comprising:

(a) conveying particulate solids from a feeder chute through a horizontal conduit and upwardly into flow passageway of a poppet type control valve, said control valve including a valve body having a seating surface incorporated therein and a mating valve head with stem attached thereto for controlling operation of the valve head in the valve body seating surface;

(b) opening said valve head a controlled amount by actuator means mechanically attached to the lower end of said valve stem;

(c) purging the valve head by passing a gas through multiple space openings in a manifold attached to the valve body adjacent the seating surface and encircling said valve head, so as to prevent deposits of the particulate solids between the valve seating surface and the valve head;

(d) passing a purge gas through a longitudinal passageway in said valve stem and outwardly through at least one opening in said stem and through a radial clearance space between said stem and the valve body to purge the clearance space, and thereby facilitate flow of the particulate solids through the control valve into the reactor.

12. A method for feeding particulate solids through a control valve upwardly into a reactor, comprising:

(a) conveying particulate solids from a feeder chute through a horizontal conduit and upwardly into a flow passageway of a poppet type control valve, said control valve including a valve body having a seating surface incorporated therein and a mating valve head with a valve stem attached thereto for controlling operation of the valve head in the valve body, said valve head being located above said valve body seating surface;

(b) opening said valve head a controlled amount by actuator means mechanically attached to the lower end of said valve stem;

(c) purging the valve head by passing a gas through multiple spaced openings in a manifold attached to the valve body adjacent the seating surface and encircling said valve head, so as to prevent deposits of the particulate solids accumulating between the valve seating surface and the valve head;

(d) passing a fluidizing gas upwardly through at least one opening located in the valve body near said valve stem to fluidize particles in the flow passageway; and (e) providing a fluidizing gas to said feeder chute to facilitate transfer of the particulate solids from said feeder chute through said horizontal passageway to the valve flow passageway, and thereby facilitate flow of the particulate solids through the control valve assembly and upwardly into the reactor.

* * * * *